E. PARKER.
Knob Attachment.
No. 224,348. Patented Feb. 10, 1880.
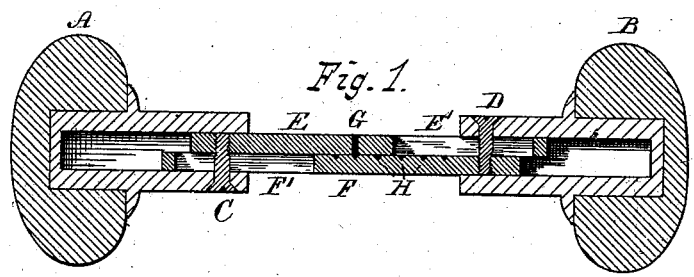
Witnesses
Wendell R. Curtis
Chas. Denison
Inventor
Emery Parker
by Thos. G. Ellis, Attorney

UNITED STATES PATENT OFFICE.

EMERY PARKER, OF NEW BRITAIN, CONNECTICUT.

KNOB ATTACHMENT.

SPECIFICATION forming part of Letters Patent No. 224,348, dated February 10, 1880.

Application filed November 10, 1879.

*To all whom it may concern:*

Be it known that I, EMERY PARKER, of New Britain, in the county of Hartford and State of Connecticut, have invented certain new and useful Improvements in Adjustable Spindles for Knob-Latches; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to the spindles to which door-knobs are attached, and which pass through the latches, so that the turning of the knob operates the latch.

The object of my improvement is to provide a spindle which can be conveniently adjusted to any length required to reach through the thickness of the door and permit the knobs to be placed any desired distance apart.

My invention consists in the construction which will be hereinafter described.

In the accompanying drawings, Figure 1 represents a longitudinal section through the spindle and attached knobs. Fig. 2 is a top view of the spindle detached from the knobs.

A and B are the knobs. C and D are the screws by which the knobs are attached to the spindle. The spindle is of the usual square section, and is divided into two parts longitudinally through the middle, as shown in the drawings at E and F. The part E has a longitudinal slot, E', through which the screw D passes into the part F. This slot allows the part E to slide into the knob B without interfering with the screw D. The part F also is provided with the slot F', for a similar purpose, so that, each knob being attached to one of the parts of the spindle and sliding upon the other, the two can be set at any required distance apart.

G is a pin inserted in the part E, the point of which enters into any one of a series of indentations or holes in the part F. This serves the purpose of holding the two parts in any position when set.

In setting the spindle to any desired length the two parts are first laid together so that the holes for the ends of the screws C and D shall be at the proper distance apart. The ends of the spindle are then inserted into the square holes in the knobs, which holds the two parts of the spindle together and prevents the pin G from moving out of the hole into which the point has entered. The screws C and D are then inserted, which secures the knobs upon the spindle.

In place of the pin G and the series of holes shown at H in the drawings, a pin and rack, or two racks fitting into each other, can be used.

It will also be observed that it is not necessary that both parts of the spindle should extend entirely across to the opposite knob. One of the parts may be made shorter, and slide upon grooves in the other, instead of being held in position by the socket of the opposite knob.

By means of my invention a much finer adjustment for the length of the spindle can be obtained than by the method commonly in use.

What I claim as my invention is—

1. A spindle for knob-latches, composed of two parts, to which the knobs are attached, sliding upon each other for adjustment, and held by a pin in one of said parts and suitable sockets in the other, substantially as described.

2. A knob-spindle composed of two parts, E and F, furnished with the slots E' and F', and the interlocking fastening between the two parts, whereby they are prevented from sliding longitudinally upon each other, substantially as described.

3. The combination of the part E, provided with the pin G, and the part F, having the indentations H, with the knobs A and B and the screws C and D, substantially as described.

EMERY PARKER.

Witnesses:
THEO. G. ELLIS,
E. E. MARVIN.